June 11, 1963  H. J. MODREY  3,093,220
ELASTIC FASTENER
Filed Feb. 11, 1959  3 Sheets-Sheet 1

INVENTOR.
HENRY J. MODREY
BY
ATTORNEYS

June 11, 1963   H. J. MODREY   3,093,220
ELASTIC FASTENER
Filed Feb. 11, 1959   3 Sheets-Sheet 2
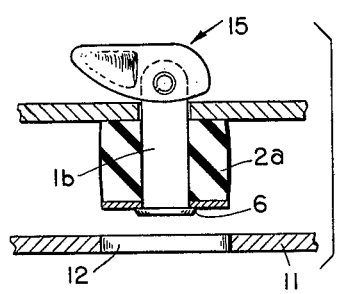
FIG. 8
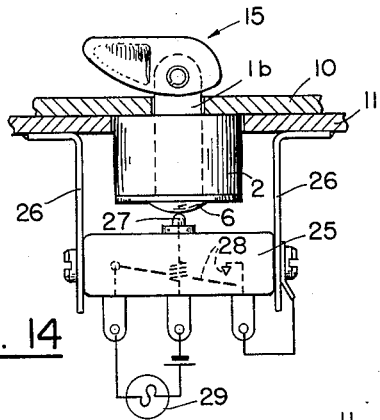
FIG. 14
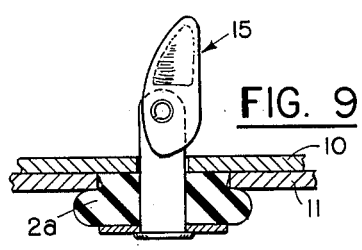
FIG. 9
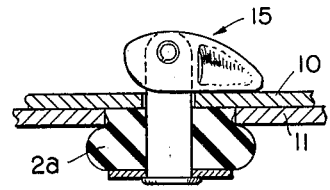
FIG. 10
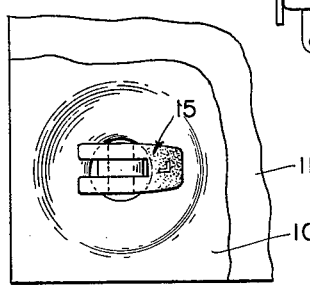
FIG. 15
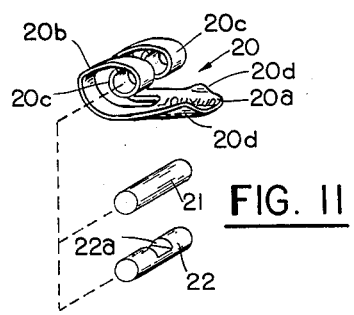
FIG. 11
FIG. 13
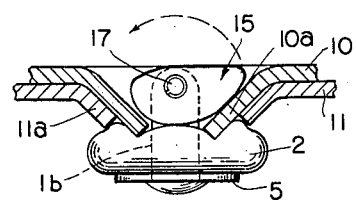
FIG. 12
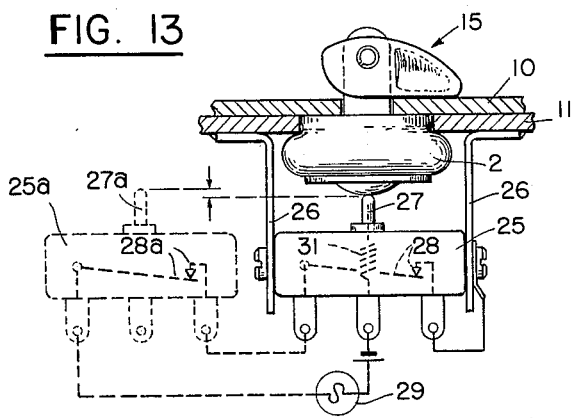
FIG. 16
INVENTOR.
HENRY J. MODREY
BY
Haure and Nydick
ATTORNEYS

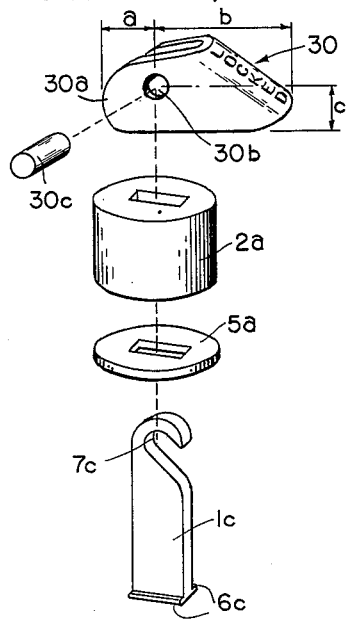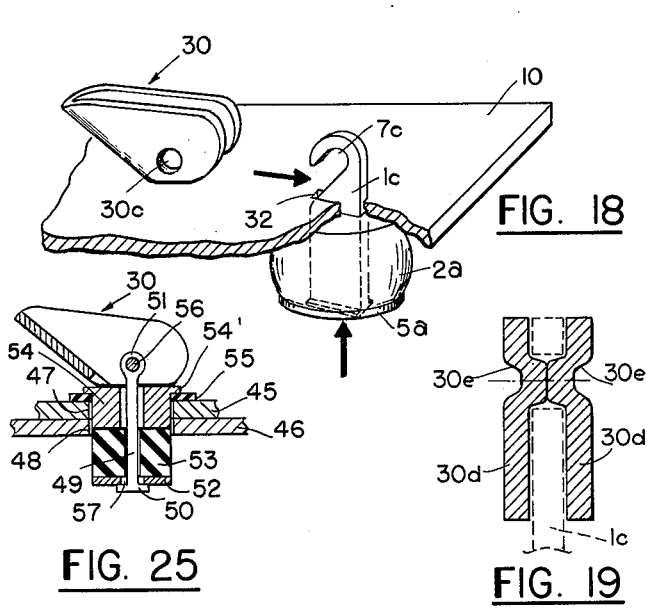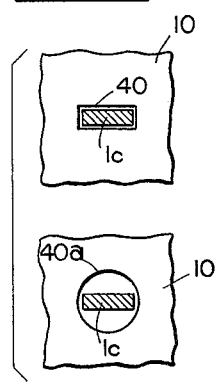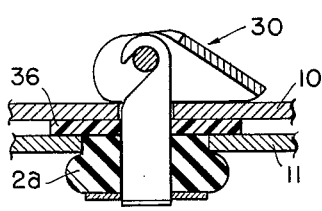

United States Patent Office 3,093,220
Patented June 11, 1963

3,093,220
ELASTIC FASTENER
Henry J. Modrey, Eagle Drive, Stamford, Conn.
Filed Feb. 11, 1959, Ser. No. 792,497
13 Claims. (Cl. 189—36)

The present invention relates to an elastic quick-release fastener for fastening together two or more members, and more particularly to a fastener of the kind which relies for its fastening or locking action upon the outward bulging of a rubber sleeve caused by a reduction of the axial length of the sleeve. In fasteners of this kind, the outward bulging is utilized to block passage of the sleeve through an opening in one of the members to be fastened through which opening the sleeve can pass in its entirely or substantially expanded state.

With all fasteners of the general kind above referred to as heretofore known, the principle used for effecting the outward bulging of the sleeve involves a rotary cam action of certain components of the fastener relative to stationarily held components. Due to the use of a rotary action, such fasteners are known as quarter or half-turn fasteners. Various designs have been developed to improve the function and reliability of the fasteners by improving the efficiency of the rotary cam action.

This invention departs entirely from this direction of development and employs an entirely new and different principle of obtaining bulging of the sleeve.

Generally speaking, the present invention resides in eliminating the rotary cam action completely rather than in improving it and in substituting a linear or axial movement of the components to cause compression and expansion of the sleeve. Fasteners using such linear movement are a new type of fastener, and the designation quarter or half-turn fastener would be misdescriptive.

My prior Patent 2,688,894, describes a fastener structure which is representative of the heretofore known designs which all employ a rotary action. According to this patent, the axial reduction of the sleeve length for locking the fastener and the re-expansion of the elastic sleeve for releasing the fastener are effected by means of a cam member upon which a camming pin is caused to ride up and down respectively. The cam assembly is actuated by rotating the pin along the camming surface of the cam member by means of a stud extending through the sleeve and the members to be fastened together. Such structure requires that the cam member and the sleeve remain rotationally stationary relative to each other and the next adjacent member to be fastened.

The required rotational locking of the fastener components causes difficulties in practice under certain operational conditions. It has been found that there is a tendency of the fastener components to slip or slide relative to each other if they come in contact with a substance having lubricating properties such as grease, soap or detergent. This makes difficult the otherwise highly desirable use of the fastener principle as disclosed in the aforesaid patent in certain fields of application, such as washing machines. Furthermore, the sensitivity of the fastener design as heretofore known, to slippery surfaces precludes, or at least makes difficult the use of synthetic rubber compositions as such compositions are generally slippery. The tedency of the fastener to slip under the aforementioned conditions is particularly marked for small sizes, in which moreover this type of fastener is highly sensitive to small variations in the thickness or gauge of the members to be fastened together by the fastener.

A further limitation of the half-turn fastener design as heretofore known, is that it does not afford a clear visual indication of its locked and open position, respectively. When the fastener is installed, the slotted head or handle of the stud is generally the only visible part of the fastener which changes its position when the fastener is moved from one position into the other. Since the fastener of the patent is not anchored to its support, it tends to rotate slightly when operated. Hence, the angular position of the slot or handle does not provide a visual indication of the fastener position.

Accordingly, it is the general object of the present invention to provide a novel and improved elastic quick-release fastener which renders it free of the limitations of the present fastener designs of the kind hereinbefore referred to, which depend upon balanced friction at both ends of the elastic sleeve and which operate by rotary rather than linear action.

More specifically, it is an object of the invention to provide a novel and improved fastener which does not rely for its operation upon frictional coherence between the coacting surfaces and hence is not affected by the presence of substances causing slipperiness of the co-acting surfaces, or by an inherent slipperiness of the sleeve material. This affords the advantage that the fastener according to the invention can be freely used in installations in which such substances are or may be present and of course also in installations in which such substances need not be expected.

Another object of the invention is a novel and improved fastener which due to its design can be manufactured in a very wide range of sizes, including miniature sizes below ⅜" hole size. Such small sizes were not practical with fasteners as heretofore known and using the principle of axial shortening of the locking sleeve, due to slippage and especially due to the critical tolerances for the dimensions of the panels and the fastener components.

It is still another object of the invention to provide a novel and improved fastener which is assembled in situ without the use of tools thereby permitting use of the fastener where and when needed and which when assembled automatically locks itself against accidental disassembly, even under shock or vibration.

A further object of the invention is to provide a fastener which affords an unequivocal visual and also a tactile indication of its locked and open position respectively. Fasteners of the kind here involved are often installed in locations of poor visibility so that the tactile indication in addition to the visual indication is very useful.

It is a still further object of the invention, allied with the preceding ones, to utilize the axial movements of the fastener components during the opening or closing of the fastener for controlling the positions of one or several circuit switches.

It is also an object of the invention to provide a fastener of the general kind above referred to, designed for use as a sheet clamp. A sheet clamp according to the invention affords not only the advantage that the sheets to be riveted together later on, are tightly held together in the correct position, but also that the pressure exerted by the sheet clamp upon the usually very thin sheet material does not cause any dimpling or other deformation of the sheet material at the hole rim, due to the fact that the sheet clamp exerts its pressure through rubber only. Such avoidance of any deformation of the sheet surface is particularly important when the sheet material is used on airborne assemblies to be moved at high air speed, such as parts of aircraft and missiles. With today's air speeds any surface deformation increases the air resistance and is hence objectionable.

Another object of the invention is to provide a fastener of the general kind above referred to, which comprises only a few components that can be inexpensively and readily manufactured by typical mass production, methods and which can be assembled without requiring special skill or tools.

Other and further objects, features and advantages of the invention will be pointed out hereinafter and set forth in the appended claims forming part of the application.

In the accompanying drawing several preferred embodiments of the invention are shown by way of illustration and not by way of limitation.

Figures 6, 6A:
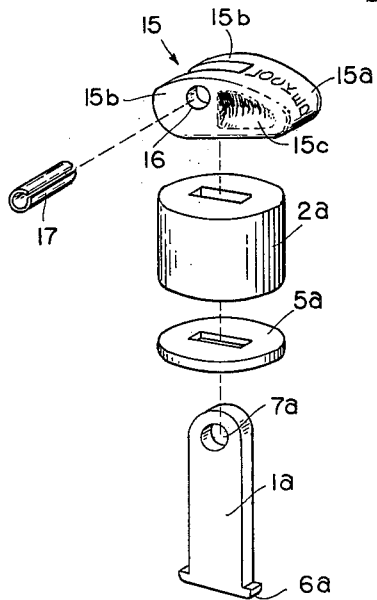
FIG. 6 is an exploded view similar to FIG. 1 showing modifications of the components of the fastener.
FIG. 6A is an exploded view of a variation of some of the components of the fastener according to FIG. 6.

FIGS. 8, 9 and 10 are sectional views of a fastener of the kind shown in FIG. 6A; FIG. 8 showing the fastener assembled on a support base and in open position; FIG. 9 showing the same fastener in a mid-way position for locking a panel to the base, and FIG. 10 showing the fastener in locked position.

FIG. 11 is a perspective view of a modification of the cam lever for the fastener and of two modifications of the pin for attaching the lever to the fastener stud.

FIG. 12 is a view, partly in section, of a locked fastener designed for assembly on a support base flush with the surface thereof.

FIG. 13 is a plan view of FIG. 12.

FIG. 14 is a sectional view of a fastener assembly for securing a switch panel to a support base and also for controlling the position of a switch mounted on the panel by the open and closed position respectively of the fastener, the fastener being shown in its open position.

FIG. 15 is a sectional view of the switch panel without the fastener and its base.

FIG. 16 is a sectional view similar to FIG. 14, but showing the switch controlling fastener in its locked position.

FIG. 17 is an exploded view of still another modification of a fastener according to the invention.

FIG. 18 is a perspective view of the fastener according to FIG. 17, in a partly assembled condition.

FIG. 19 is a sectional view of a modification of the cam lever of a fastener according to the invention on an enlarged scale.

FIG. 20 is a sectional view of the fastener according to FIG. 17 fully assembled on a support base and ready for securing a panel to the support base, the fastener being shown in its open position.

FIG. 21 is a sectional view similar to FIG. 20, but showing the fastener in its locked position.

FIG. 22 is a modification of the fastener according to FIGS. 20 and 21, shown in its locked position.

FIG. 23 is a sectional view of still another modification of the fastener according to FIG. 20 and 21, also shown in its locked position.

FIG. 24 shows a stud of rectangular cross-section and the insertion of such stud in either a rectangular or a circular mounting hole, and FIG. 25 is a sectional view of a fastener according to the invention adapted for use as a sheet clamp.

Basically a fastener according to the invention, comprises a stud, an axially deformable elastic sleeve, a cam lever and a pivot pin for hinging the lever to the stud. The pivot pin may be a separate pin or formed as part of the cam lever as will be explained hereinafter. Optionally, one or several spacers or washers may be provided. The aforementioned components are generally supplied disassembled and are assembled in situ, for instance, on a support base.

Referring first to FIGS. 1 through 5 in detail, the fastener according to these figures comprises a stud 1, a sleeve 2, a cam lever 3 and a pivot pin 4 which is formed by a bridge extending between two shanks of a bifurcated portion of the lever. Optionally, one or several rigid washers 5 may be provided. The use of washers affords a convenient means for adjusting the same fastener assembly to support panels of different thickness by varying the number or thickness of the washers.

Stud 1 terminates at one end in head 6 and at the other end in a hook portion 7. The stud as shown has a round cross-section, but may also have a flat cross-section as will appear from the subsequent figures.

Sleeve 2 is made of a suitable flexible material such as natural rubber, a rubber composition or synthetic rubber. As previously explained, the frictional properties of the sleeve are not essential for the function of the fastener so that any material can be selected which possesses adequate power of recovery after deformation and is sufficiently inexpensive. Cam lever 3 may be produced by any suitable means such as pressing or punching out of sheet material. It has a longitudinally curved grip portion 3a from which extend two prongs or branches 3b, each terminating in a beaded or turned-over end portion 3c. The two branches of 3b are joined at an intermediate point by a bridge 4 which forms the aforementioned pivot pin. The washer 5 is made of a suitable rigid material such as metal or hard rubber which will not appreciably deform at the pressures here involved.

The components of the fastener may have the size shown in FIGS. 1 through 4. They may also be larger, but it is more important that they may be considerably smaller withou causing prohibitive manufacturing and operational difficulties; sleeve diameters of one-quarter inch and even less are quite feasible.

The fastener is assembled on a support panel 10 by slipping one or several washers 5 depending upon the thickness of panel 10 and sleeve 2 upon the stud and pushing the hooked stud portion through an appropriately dimensioned mounting opening 13 in the base.

The thickness of the washer and the base, the length of the stud and the sleeve are all so correlated that the hooked stud portion protrudes from base 10 sufficient to permit insertion of pivot 4 in the recess defined by the stud hook 7 and a depending nose portion 7' thereof. For this purpose, the cam lever is placed in about the position shown in FIG. 2 in which the convex side of grip portion 3a faces panel 10.

In order to retain the lever securely in pivotal engagement with the hook, the sleeve 2 may be given a length slightly in excess of the length at which stud 1 would protrude sufficiently if the sleeve is fully expanded to permit a freely sliding insertion of pivot 4 into the hook recess. As a result of this excess length of the sleeve, the same must be slightly axially deformed by pressing the headed end of the stud toward panel 10 before the hooked stud portion will protrude sufficiently to permit entry of pivot 4. When the stud and with it the sleeve are now released, the sleeve will tend to return into its fully expanded position, thus pulling the stud downwardly in reference to panel 10. As a result, the depending nose 7' will prevent an unintentional disengagement of the pivot from the hooked portion 7 even if the fastener is subjected to vibration and shock. The tensioning of the sleeve and with it of the entire fastener assembly will also effectively prevent a rattling noise of the fastener components.

The same effect of compelling a preloading of the sleeve before the cam lever can be hooked to the stud, may of course also be obtained by appropriately dimensioning the length of the stud and/or the thickness of the washer.

The slight loading of sleeve 2 simultaneously with the assembly of the fastener on its support this constitutes a safety means which becomes automatically effective when the fastener is assembled.

The fastener is now ready to lock one or several panels or other suitably shaped members to panel 10.

FIGS. 2, 3, 4 and 5 illustrate the locking of a panel 11 to panel 10. Panel 11 (and any other panel to be locked to panel 10) has an opening 12 which fits sleeve 2 in its fully-expanded or a slightly pre-loaded condition. The sleeve 2 and the washer 5 are slipped through hole 12 so that panels 10 and 11 are in close parallel relationship.

Figure 2:
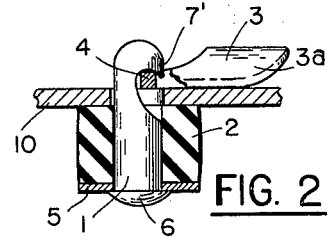
FIG. 2 is a sectional view of the fastener of FIG. 1 assembled on a support base, the fastener being shown in its open position.

The position shown in FIG. 2 constitutes the unlocked or open position of the fastener as it permits the addition or removal of a part to be locked to the panel 10.

Figure 3:
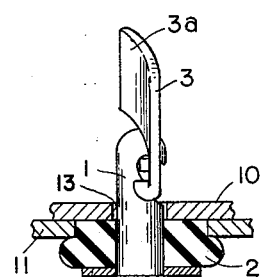
FIG. 3 is a sectional view similar to FIG. 2 showing the fastener in an intermediate position for locking the panel to the support base.
Figure 4:
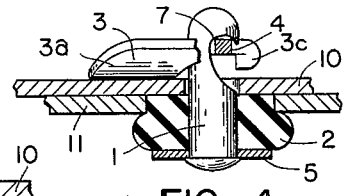
FIG. 4 is a sectional view similar to FIG. 3 showing the fastener in its locked position.
Figure 5:
FIG. 5 is a fragmentary sectional view of FIG. 2 on an enlarged scale, showing the axial movement experienced by the fastener's stud during the closing operation.

In order to move the fastener from the open position into the locked position, cam lever 3 is turned from the position in FIG. 2 into the position of FIG. 4, that is, through an angle of 180° in counter-clockwise direction. As is apparent from the previous description, the cam lever functions as a lever having an initial fulcrum at its reinforced ends 3c. When and while the lever is turned, the reinforced ends 3c will press downwardly against the surface of panel 10 and thus resist the effort to turn lever 3 about pivot 4, the length of lever branches 3b being in excess of the initial distance between panel 10 and the pivot axis of pivot 4. As a result, pivot 4 and with it stud 1 will be raised relative to panel 10 until lever 3 reaches the up-and-down position of FIG. 3. In this position, the upward movement of the stud is at its maximum. The lifting of the stud causes a corresponding reduction of the axial space left for sleeve 2 between washer 5 and panels 10 and 11. As a result, the sleeve is forced from the substantially cylindrical configuration of FIG. 2 into the position of FIG. 3 in which the sleeve has its maximum bulge so that this position constitutes the toggle position. The sleeve now overhangs the opening in panel 11 thereby securing panel 11 to panel 10. When now the counter-clockwise turning of lever 3 is continued from the position of FIG. 3 into the limit position of FIG. 4, sleeve 2 will undergo a slight re-expansion due to the fact that the length of the lever arm defined by the pivot axis and the tip or reinforced ends 3c is slightly larger than the distance between the center of the pivot axis and the longitudinal side of the lever now facing and resting upon panel 10. Such slight difference in the distance involved affords the advantage that the lever cannot accidentally jump from the position of FIG. 4 into the position of FIG. 2, that is, into the open position, by the loading of sleeve 2 or by impact. As is apparent, return of the lever from the position of FIG. 4 into the position of FIG. 2 involves passage through the position of FIG. 3 and this in turn involves a slight reloading of sleeve 2 which cannot be effected accidentally or by the pull of the sleeve when the lever is in the position of FIG. 4, but requires the application of an external force.

The provision of the toggle position of FIG. 3 also safeguards the sleeve against overloading beyond its inherent compression tolerance. If, for example, the user tries to assemble the fastener on a panel which is too thick for the fastener assembly, he will find that it is impossible or exceedingly difficult to turn the lever into its upright or toggle position.

Finally, it will be noted that the configuration of the side of lever 3 facing upwardly in FIG. 2 is different from the configuration of the lever side facing upwardly in FIG. 4. This difference in configuration affords not only a viewable but also a tactile indication whether the fastener is in the open position of FIG. 2 or in the locked position of FIG. 4.

The length of the actuating lever arm 3a in the previously described and the subsequent figures may be such that the lever can be conveniently turned by hand, but it may also be so short that a tool such as a screwdriver must be pushed under the tip of the lever or inserted in a slot provided in the lever for turning the same. Such compulsory operation by means of tools affords a desirable safeguard in certain fields of application.

Figure 7:
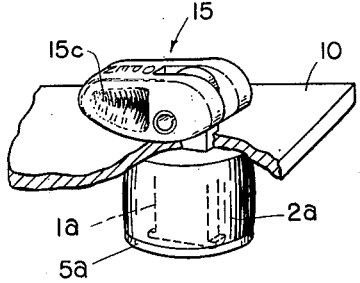
FIG. 7 is a perspective view of the fastener according to FIG. 6 showing the fastener assembled on a support base in its open position.

FIGS. 6, 6A and 7 show fastener designs which are modified in detail, but employ the same principle.

FIG. 6 shows a stud 1a of rectangular cross-section terminating at one end in a protrusion or flange 6a and at the other end in a transverse bore 7a. Bore 7a corresponds in function to hook 7 in that both constitute a bearing for the pivot axis of the lever. The fastener further comprises an optional washer 5a and a sleeve 2a. Both the washer and the sleeve have rectangular bores to accommodate stud 1a. The lever 15 is rather different in its configuration from that of lever 3, but incorporates the same basic features. Part of the lever body is bifurcated to form two branches 15b. The branches have aligned transverse bores 16 therethrough. In order to hinge the lever to the stud, a pivot pin 17, shown as a rolled pin, is passed through bores 16 and bore 7a of the stud. Bores 16 which define the pivot axis of the lever are so located that two lever arms of unequal length are formed. One lever arm includes branches 15b and the other lever arm 15a is solid. As is also apparent from FIG. 6, the axis of bores 16 is located outside the median longitudinal plane of the lever. As a result, the distance between the pivot axis and the lower longitudinal side of the lever (as shown in FIG. 6) is greater than the distance between the pivot axis and the upper longitudinal side of the lever. Furthermore, the length of the lever arm defined by the pivot axis and the tip of branches 15b is slightly in excess of the distance between the pivot axis and the lower side of the lever. The tip of branches 15b has preferably the curvature shown in FIG. 6.

Figure 1:
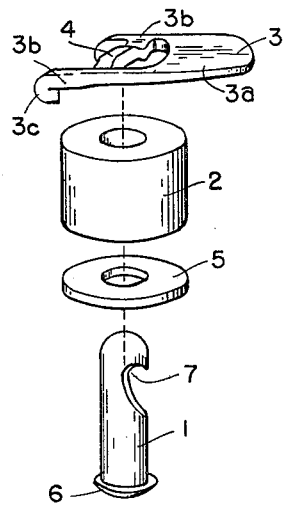
FIG. 1 is an exploded view of a fastener according to the invention.

According to FIG. 6A, the stud 1b has a lower round portion similar to the stud of FIG. 1 and a rectangular upper portion similar to the stud of FIG. 6. The round stud portion accommodates washer 5 and sleeve 2 which accordingly have round bores. The lever of FIG. 6A should be visualized as being identical with that of FIG. 6.

FIG. 7 shows the fastener of FIG. 6 assembled on panel 10. The fastener is shown in the open position. Again the open and the locked position respectively of the fastener can be ascertained not only by visible observation but also by tactile determination due to the difference in configuration of both sides of the lever. To facilitate visual observation, the respective sides of the lever are marked "open" and "locked." To lock the fastener, the lever is turned through an angle of about 180° from the position of FIG. 7. The locking action of the fastener is evident from the previous description. It suffices to state that the lever will pass through the toggle or safety position of maximum compression of the sleeve corresponding to the position of FIG. 3 and will be retained in its locked position after it has passed through the position of FIG. 3.

To facilitate pivoting of the lever against the rather strong counter pull of sleeve 2, lever arm 15a may be indented at 15c to provide a convenient grip.

FIG. 8 shows a fastener of the kind shown in FIG. 6A assembled on panel 10 and ready to receive panel 11 for securing the same to panel 10 by locking the fastener.

FIG. 9 shows the fastener of FIG. 8 in an intermediate stage of the locking operation which involves pivoting lever 15 in clock-wise direction through an angle of about 180°. The stage of FIG. 9 corresponds to the toggle position explained in detail in connection with FIG. 3, that is, sleeve 2a is compressed slightly beyond the stage of compression which it will have in the locked final position of the fastener shown in FIG. 10 thus preventing accidental opening of the fastener. As is apparent, sleeve 2a in the position of FIG. 10 overhangs panel opening 12 with a considerable bulge thereby safely holding panel 11 to panel 10. Lever 15 now rests with its substantially plane side upon panel 10 thereby preventing wobbling of the fastener in reference to the panels. To unlock the fastener, lever 15 is returned from the position of FIG. 10 into the position of FIG. 8 by forcing the lever past the up-and-down position of FIG. 9.

FIG. 11 shows a modification of the lever and two kinds of pivot pins for hinging the lever to the stud which may have any of the designs shown in the previously described figures.

According to FIG. 11, the lever 20 is made from sheet material by any suitable forming operation. The strip of sheet material from which the lever is made is longitudinally slotted to form two branches or shanks 20b. The end of each branch is bent to form a sleeve 20c. The two sleeves 20c are aligned and correspond in function to the bores 16 in FIG. 6. The solid portion 20a is preferably longitudinally curved in a manner similar to the lever shown in FIGS. 1 through 4. Upwardly turned lips 20d may be provided to form grips for a more convenient handling of the lever against the pressure of sleeve 2.

The respective dimensions of the lever in relation to the pivot axis defined by sleeves 20c is the same as has been described in connection with FIGS. 1 through 4 and other figures, that is, the pivot axis defines two lever arms of unequal length, the longer lever arm being formed by lever portion 20a and the shorter lever arm by branches 20b. The length of the shorter lever arm is slightly in excess of the maximum distance between the pivot axis and the lower longitudinal side of the lever (as shown in the figure) which in turn is in excess of the distance between the pivot axis and the upper longitudinal side of the lever.

The lever may be attached to the stud either by a cylindrical pivot pin 21 or by a pivot pin 22 the middle portion of which is notched at 22a. Of course, the slotted pin 17 may also be used. Similarly, pins 21 and 22 may be used in the fastener of FIGS. 6, 6A and 7.

The lever of FIG. 11 may be hinged to the hook type stud of FIGS. 1 through 4 by force-fitting the pivot pin in sleeves 20c or otherwise securing the pin the sleeves, or it may be applied to lever 15 by inserting the pin in the bearing bore 7a of the stud.

The function of the lever of FIG. 11 will be evident from the previous description.

In all the previous figures, the support panel and the panel to be fastened thereto are shown as having flat surfaces from which the stud and the lever protrude accordingly. In some fields of application, it is desirable to avoid any components raised above the surface of the support panel. According to FIGS. 12 and 13, the panel portion 10a including the opening for the stud is depressed and similarly the panel portion 11a including the opening for sleeve 2 is depressed to accommodate the protruding portion of stud 1b and lever 15 in either the open or the locked position thereof.

The function of the fastener in FIG. 11 is the same as previously described, but as will be noted, the upper side of the fastener in either of the two limit positions thereof, is flush or substantially flush with the upper side of panel 10. FIG. 12 which shows the fastener in the locked position also shows that the material of sleeve 2 will automatically assume contours conforming to the rims of panel portion 10a and 11a thereby effectively sealing the openings through the panels.

As will be evident, all the fastener designs described hereinbefore and hereinafter may be utilized for the flush mounting of FIGS. 12 and 13.

FIGS. 14 through 16 show an arrangement in which fasteners according to the invention are used for a dual purpose, namely, to secure the two panels 10 and 11 to each other and also to control a switch assembly.

According to FIG. 14, a fastener of the kind shown for instance in FIG. 6A and FIGS. 8 through 10, is assembled on panel 10 as previously described. The fastener is shown in its open position.

The switch assembly to be controlled is shown as a miniature snap switch 25. The switch is suspended from panel 11 to be fastened to panel 10, by means of two brackets 26 or in any other suitable manner. More specifically, the switch shown is of the type having an actuating button 27 which when released closes contacts 28 within the switch. By way of example, a circuit including a lamp 29 and a source of current is shown as being controlled by the switch contacts. The axial length of the fastener stud is selected so that when the fastener is in open position of FIG. 14, the enlarged stud end presses against switching button 27 thereby holding the same in the position in which switch contacts 28 are open. When the fastener is locked by turning lever 15 from the position of FIG. 14 in the position of FIG. 16, panel 11 is locked to panel 10 by the aforedescribed outward bulging of sleeve 2 and the stud is sufficiently raised to permit movement of switch button 27 from the position of FIG. 14 into the position of FIG. 16 whereby the switch closes its contacts 28 by the action of a spring 31. As a result, the circuit of lamp 29 is closed. The lamp 29 may be placed as an indicator lamp to show locking of the fastener and also operation of any further circuits which may be controlled by switch 25.

As appears from FIG. 15, closing of the switch and hence illumination of the indicator light may also be effected by removing panel 10 and with it the fastener from panel 11.

In this connection, it may mentioned that the switch may, course, be so arranged that it is closed when the fastener is locked. FIG. 16 further shows that one or several switches 25a may be connected to switch 25 series or in parallel. Each of the additional switches may be visualized as being controlled by the operation of a fastener.

FIGS. 17 and 18 show an exemplification of a fastener according to the invention, the design of which has been found particularly suitable for producing and manipulating fasteners of very small size. The design of FIGS. 17 and 18 lends itself to the manufacture and operation of fasteners below 3/8" diameter hole size. It can, of course, also be used for fasteners of larger size.

As can be best seen in the exploded view of FIG. 17, the fastener comprises a stud 1c of the hook type. The stud has a rectangular cross-section and terminates at one end in an enlargement shown as a flange 6c and at the other end in an open hook 7c. The sleeve 2a and the optional washer 5a of the fastener are similar to those shown in FIG. 6 and hence designated by the same reference numerals. However, in the design of 17 and 18, the axial length of the sleeve in its expanded state in reference to the stud with which it coacts is somewhat different from the sleeve length in the designs previously described as will be more fully explained hereinafter.

The lever 30 is similar in principle to all the lever designs previously shown and described.

The lever may be formed of a flat, suitably cut piece of sheet metal which is bent to form a generally U-shaped structure, or it may be made by die-casting. The two arms 30a of the lever extend parallel to each other. Each arm has a transverse bore 30b. The two bores are in alignment to provide for the insertion of a pivot pin. Pin 30c may be rolled or solid, but it is essential that it is fixedly secured within the lever branches, at least when the lever is of miniature size as it has been found that the insertion of the pin by the user during assembly is inconvenient when the lever and accordingly, the pin are very small. In other words, the lever of FIG. 17 is supplied to the user with the pin fixedly inserted therein along with the other components 1c, 2a and 5a of the fastener.

Instead of providing a pivot pin fixedly inserted in bores through the lever branches, two branches 30d, as shown in FIG. 19, may each have an inwardly extending protrusion or dimple 30e. These protrusions complement each other to form a pivot pin extending across the two branches of the lever.

The pivot axis defined by a pivot pin, either of the kind shown in FIGS. 17 and 18 or of the kind shown in FIG. 19, is again located outside the longitudinal median plane of the lever. Accordingly, the pivot axis defines two lever arms, each computed from the pivot axis to the respective longitudinal end of the lever and show as being of unequal length. The length of the shorter lever arm is again slightly in excess of the distance between the pivot axis and the longitudinal lever side more remote from the pivot axis, this lever side being the lower lever side in FIG. 17. Accordingly, $$a < b$$
$$a > c$$

The two longitudinal lever sides are flattened and the upper lever side is considerably shorter than the lower lever side to form a convenient grip for the operation of the fastener as will appear more fully from the subsequent description.

In order to asemble the fastener on panel 10, the user slides bottom washer 5a and sleever 2a upon the hooked stud and pushes this preassembly through opening 32 in panel 10. Lever 30 is placed in about the position shown in FIG. 18, that is, facing upwardly with its longer longitudinal side for slipping pivot pin 33 in hook 7c. However, in the design of FIGS. 17 and 18, the axial length of sleeve 2a in its fully expanded state is such that hook 7c does not provide sufficient clearance for the insertion of the pin when the respective face of sleeve 2a rests against the lower side of panel 10. In order to accomplish insertion of the lever in the hook, the user must first apply an upward pressure to the bottom of the stud in the direction of the perpendicular heavy arrow until the stud hook has sufficiently emerged to permit insertion of the lever pivot pin. As a result of this upward push, sleeve 2a will assume the slightly bulged configuration of FIG. 18. After insertion of the lever, sleeve 2a will re-expand until stopped by a full engagement of hook 7 with the pivot pin. The dimensions of the hook and the location of the pivot pin are so correlated that the sleeve cannot fully re-expand when the pivot pin is inserted. The resulting pre-loading of the sleeve serves to retain the lever safely on the hook and also to prevent wobbling of the lever.

It should be noted in this connection that the preloading of the sleeve when the fastener is assembled in its open position, may also be applied to all the previously described embodiments of the invention and similarly the design of FIGS. 17 and 18 is entirely capable of functioning without pre-loading of the sleeve. The bulging of the sleeve by the pre-loading must of course be such that it does not prevent passage of the sleeve through the opening in panel 11 to be attached to panel 10.

The fastener is now ready to receive panel 11 and FIG. 20 shows the fully assembled fastener inserted in panel 11, but still in its open position. As is apparent from this figure, the slanted lever surface leading from the short side of the fastener to the long side thereof faces upwardly thus providing a convenient grip for the fastener to pivot the same against the rather strong counter pressure of the sleeve. In order to lock the fastener, the same is pivoted from the position of FIG. 20 into the position of FIG. 21 in the direction indicated by the arrow in FIG. 21. The pivoting of the lever effects an axial lifting of the stud relative to panel 10. The axial rise of the stud reaches its maximum when the lever is in its up-and-down position as has been previously explained in detail.

As is evident, the configuration of the lever provides not only a visual but also a tactile indication whether the fastener is in its open or in its locked position. The lever side facing upwardly in the locked position of the fastener may be marked "locked."

FIG. 22 shows an arrangement very similar to that just described except that a washer 35 is interposed between sleeve 2a and panel 10. This washer does not participate in the deformation of the sleeve when the fastener is locked and may be used to adjust the fastener to panels 11 of different thickness as is indicated in FIG. 22. The length of the stud must, of course, be selected accordingly.

FIG. 23 shows a fastener of the kind previously described and it further shows a washer or gasket 36 interposed between panels 10 and 11. The provision of such rubber washer or gasket avoids a direct metal contact between panels 10 and 11 which is desirable for certain fields of application. The length of the stud in FIG. 23 must of course be selected to compensate for the thickness of washer 36.

As is shown in FIG. 24, the mounting opening in panel 10 may either be a rectangular opening 40 fitting stud 1c or a round opening 40a, even though the stud is rectangular. In the latter arrangement, the fastener as a whole may be turned relative to the panel. This is desirable in some instances and does not affect the operation of the fastener as the same relies for locking action upon an axial displacement of the stud rather than upon frictional engagement between abutting surfaces as does a fastener according to my aforesaid Patent 2,688,894. Broadly speaking, FIG. 24 shows that the peripheral outline of the mounting opening in the support member need not to match the peripheral outline of the stud.

FIG. 25 shows the use of a fastener according to the invention as a sheet clamp. Sheet clamps are used to retain the holes in two or more sheets in registry prior to the permanent joining of the sheets by means of rivets. The sheet clamps are removed after an adequate number of rivets has been set.

The sheet clamp or fastener shown in FIG. 25 is somewhat different in design from the previously shown fasteners, but employs the same principle, that is, it relies for locking action upon axial displacement of an actuating member and the resulting outward bulge of an axially deformable sleeve. More specifically, the sheet clamp comprises a rod 49 which corresponds in function to the previously described stud. The rod terminates at one end in an enlargement 50 and at the other end in an eyelet or ring 51. The sheet clamp further comprises, starting at the bottom, an optional washer 52, a rubber sleeve 53 and a rigid bushing 54 made of metal or plastic. Both the sleeve and the bushing fit sheet openings 47 and 48, but bushing 54 is flanged at 54'. A soft rubber washer 55 is interposed between flange 54' and sheet 45. The purpose of the washer is to prevent a direct contact between the hard bushing and sheet 45. Sheet clamps are frequently used to retain in position thin sheets such as aluminum sheathing used for aircraft frames or other airborne assemblies. The pressure asserted by the pull of sleeve 53 upon the sheets, particularly the upper sheet, during the locking of the sheet clamp tends to cause a dimpling of the sheets adjacent to the holes. As mentioned before, such dimpling results in a noticeable increase of the air resistance at modern air speeds and is avoided by the interposition of washer 55. The lever 30 is shown as being of the kind shown in FIG. 17 for instance, but other lever designs according to the invention may of course also be used. The lever is hingedly mounted within eyelet or ring 51.

The sheet clamp is assembled on bushing 54 by slipping the clamp components upon rod 49 in the illustrated order. An opening 57 of adequate diameter in washer 52 permits passage of ring or eyelet 51 through the washer. The bores through sleeve 53 and bushing 54 must be, of course, of a size such as to permit passage of the ring also. After all the parts are assembled on the rod, the lever is attached to the rod by the pivot pin 56.

In use, the sheet clamp assembly is pushed through two holes 47 and 48 in sheets 45 and 46 and is locked by turning lever 30 as previously described.

The function of the sheet clamp will be generally apparent from the previous description.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A fastener for releasably fastening together several plate members, each having an opening therethrough, said fastener comprising an axially deformable elastic sleeve, a stud fitting the bore of said sleeve and having a length in excess of the length of the sleeve in its expanded state, one end of the stud being enlarged to prevent the passage of the stud through the sleeve bore and the other end of the stud terminating in an open hook, the open side of said hook facing downwardly and forming a bearing, and a two-armed lever insertable in said open hook pivotal about a pivot axis transverse of the axis of said stud, said lever including a pivot pin extending transverse of the longitudinal axis of said lever and defining transverse distances of unequal length between the pivot axis and the longitudinal sides of the lever and also defining two lever arms of unequal length, the longitudinal sides of said lever arms being plane and substantially parallel one with the other and the free end of the shorter lever arm forming a cam surface concavely curved with reference to the pivot axis of the lever, the maximum longitudinal distance between said cam surface and the pivot axis of the lever being greater than the longer transverse distance between said pivot axis and the respective longitudinal side of the lever, said lever being pivotal through an angle of about 180 degrees between a first limit position in which the longitudinal lever side closer to the pivot axis is parallel and adjacent to the plate members to be fastened together and a second limit position in which the longitudinal lever side more distant from the pivot axis is parallel and adjacent to the plate members, said first limit position constituting the release position of the fastener and said second limit position the locking position, whereby the lever passes through a dead center position upon being pivoted from one limit position to the other.

2. A fastener according to claim 1 wherein the shorter arm of said lever includes a bifurcated portion forming two longitudinally extending branches and a bridge joining said branches, said bridge constituting the pivot pin, and said stud hook being insertable between said branches to engage said pivot pin.

3. A fastener according to claim 1 wherein the shorter arm of said lever includes a bifurcated portion to form two longitudinally extending branches, said pivot pin extending across said branches, and said stud hook being insertable between said branches to engage said pivot pin.

4. A fastener according to claim 1 wherein the shorter arm of said lever includes a bifurcated portion to form two longitudinally extending branches, each of said branches having an inwardly extending protrusion, said protrusions complementing each other to form said pivot pin, and said hook being insertable between said branches to engage said pivot pin.

5. A fastener according to claim 1 wherein said lever has a bifurcated portion to form two longitudinally extending branches, said branches having aligned transverse bores therethrough, said bores defining the pivot axis of the lever and wherein a pivot pin is insertable in the bores of said branches and in the stud bore to hinge the lever to said hook.

6. A fastener according to claim 1 wherein said stud end including the hook portion has a circular cross-section, said sleeve having a bore of a circular cross-section.

7. A fastener according to claim 1 wherein said stud has a portion of circular cross-section adjacent to its enlarged end and a portion of rectangular cross-section including said hook, said sleeve having a bore of circular cross-section.

8. A fastener according to claim 1 wherein said stud has a rectangular cross-section, said sleeve having a bore of rectangular cross-section.

9. A fastener assembly for releasably fastening together several plate-shaped members, each having an opening therethrough, said fastener assembly comprising, in combination, a plate-shaped support member having an opening therethrough, an axially deformable elastic sleeve, the maximum peripheral outline of said sleeve in its expanded stage overhanging the opening of said support member but fitting the opening of a member to be fastened, a stud fitted through the opening of said support member and the bore of said sleeve and protruding from the support member on the side of the latter opposite the sleeve, the protruding stud portion terminating in a downwardly facing open hook and the other end of the stud being enlarged to retain the sleeve on the stud, and a two-armed lever detachably hinged in said hook pivotal about an axis transverse of the stud axis, said lever pivot axis defining two arms of unequal length and being disposed asymmetrically in reference to the spacing of the longitudinal sides of the lever therefrom to define unequal transverse distances between the pivot axis and said longitudinal lever sides, the longitudinal sides of said lever arms being plane and substantially parallel one with the other and the free end of the shorter lever arm forming a cam surface concavely curved with reference to the pivot axis of the lever, the maximum longitudinal distance between said cam surface and the pivot axis of the lever being greater than the longer transverse distance between said pivot axis and the respective longitudinal side of the lever, said lever being pivotal through an angle of about 180 degrees between a first limit position in which the longitudinal lever side closer to the pivot axis is parallel and adjacent to the plate members to be fastened together and a second limit position in which the longitudinal lever side more distant from the pivot axis is parallel and adjacent to the plate members, said first limit position constituting the release position of the fastener and said second limit position the locking position, whereby the lever passes through a dead center position upon being pivoted from one limit position to the other, said sleeve having an outwardly bulged configuration overhanging the opening in the member to be fastened in said second limit position.

10. A fastener assembly according to claim 9 wherein a pivot pin on said lever is detachably insertable in said hook to constitute said pivot axis.

11. A fastener assembly according to claim 9 wherein the shorter lever arm is bifurcated to form two branches and a pivot pin detachably insertable in said hook extends between said branches secured thereto.

12. A fastener assembly according to claim 11 wherein said sleeve has a length effecting a slightly axially deformed configuration thereof in the open position of the fastener assembly thereby pre-loading the sleeve whereby the pull of the elastic sleeve toward return into its fully expanded state holds the stud in a position in which the hook thereof retains the pivot pin.

13. A fastener assembly according to claim 9 wherein the side of the support member from which the bearing portion of the stud protrudes is indented to accommodate the lever substantially flush with the respective surface of said side.

References Cited in the file of this patent

UNITED STATES PATENTS

| | | |
|---|---|---|
| 228,697 | Thompson | June 8, 1880 |
| 420,701 | Schaller | Feb. 4, 1890 |
| 565,193 | Wheeler | Aug. 4, 1896 |
| 685,254 | Caldwell | Oct. 29, 1901 |
| 687,177 | Caldwell | Nov. 19, 1901 |
| 1,102,937 | Malaby | July 7, 1914 |
| 1,373,619 | Kohn | Apr. 5, 1921 |
| 1,457,182 | Mallory et al. | May 29, 1923 |
| 1,650,565 | Alexander | Nov. 22, 1927 |
| 1,652,126 | Hallar et al. | Dec. 6, 1927 |
| 1,702,359 | Molmark | Feb. 19, 1929 |
| 2,113,852 | Meade | Apr. 12, 1938 |
| 2,185,782 | Brittin | Jan. 2, 1940 |
| 2,567,508 | Carson | Sept. 11, 1951 |
| 2,605,924 | Green | Aug. 5, 1952 |
| 2,688,894 | Modrey | Sept. 14, 1954 |
| 2,818,095 | Stahl et al. | Dec. 31, 1957 |
| 2,887,926 | Edwards | May 26, 1959 |
| 2,996,760 | Dennis et al. | Aug. 22, 1961 |

FOREIGN PATENTS

| | | |
|---|---|---|
| 21,838 | Great Britain | of 1896 |
| 4,682 | Great Britain | of 1907 |
| 147,124 | Australia | July 1, 1952 |